Aug. 16, 1960

C. H. SPARKLIN 2,949,251

CORD REEL

Filed April 9, 1958

INVENTOR.
Charles H. Sparklin
BY
Schroeder, Hofgren, Brady & Wegner
Attorneys

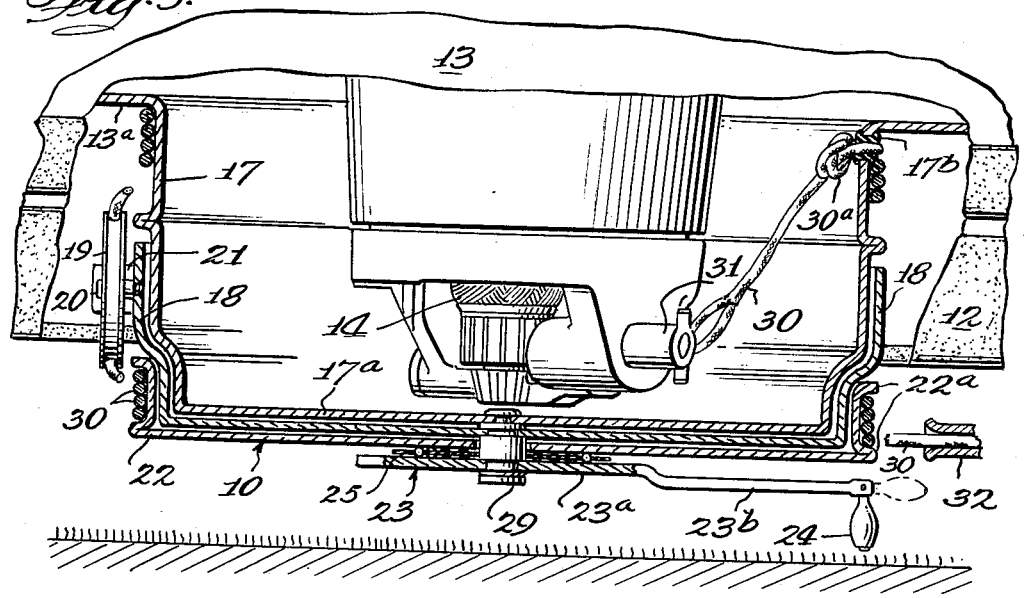
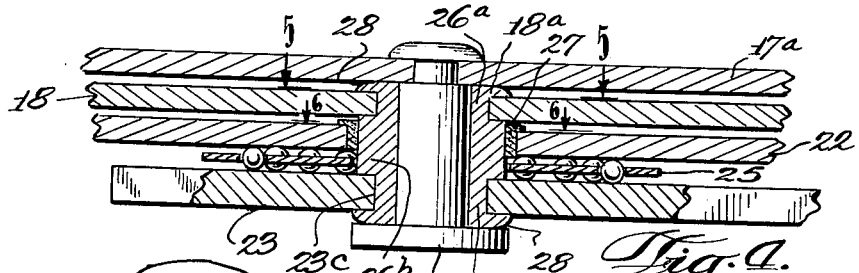
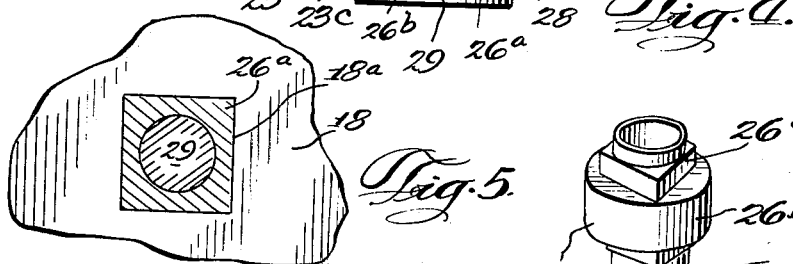
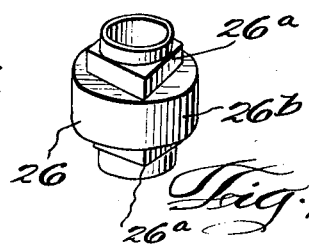
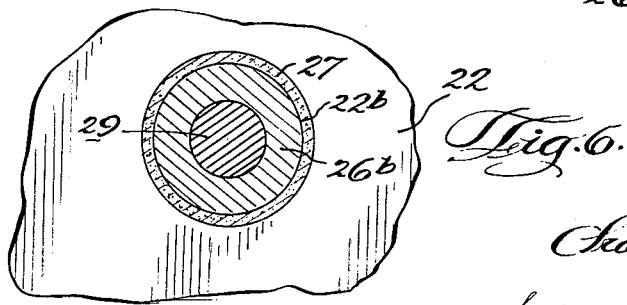

United States Patent Office 2,949,251
Patented Aug. 16, 1960

2,949,251
CORD REEL

Charles H. Sparklin, St. Joseph, Mich., assignor to Whirlpool Corporation, a corporation of Delaware Filed Apr. 9, 1958, Ser. No. 727,404

3 Claims. (Cl. 242—86.5)

This invention relates to a cord reel for use on an electrical appliance such as a vacuum cleaner.

It is generally tedious and time consuming for the user of electrical appliances such as vacuum cleaners to wind the electrical cord for storage purposes either about the appliance or about storage brackets. Moreover, it is also difficult to unwind the cord from such a location when it is desirable to operate the appliance.

One feature of this invention is to provide an improved cord reel including a winding and storage mechanism designed to overcome these problems, comprising a substantially stationary member arranged to receive turns of a cord, the cord having a portion anchored adjacent the member, a rotatable reel portion arranged to receive turns of the cord spaced from the member, a rotatable winding element having a section of the cord passing thereover interposed between the member and reel portion and arranged to move relative to the member and reel portion to draw the cord thereon and means for rotating the winding element.

Other objects and advantages of the invention will become apparent from the following description taken together with the accompanying drawings. Of the drawings:

Figure 3 is a diametrical sectional view of the cord reel;

Figure 4 is a fragmentary enlarged view of a portion of Figure 3;

Figure 5 is a sectional view taken substantially along the line 5—5 of Figure 4;

Figure 6 is a sectional view taken substantially along the line 6—6 of Figure 4; and Figure 7 is a perspective view of the mounting shaft of the cord reel.

Figure 1:
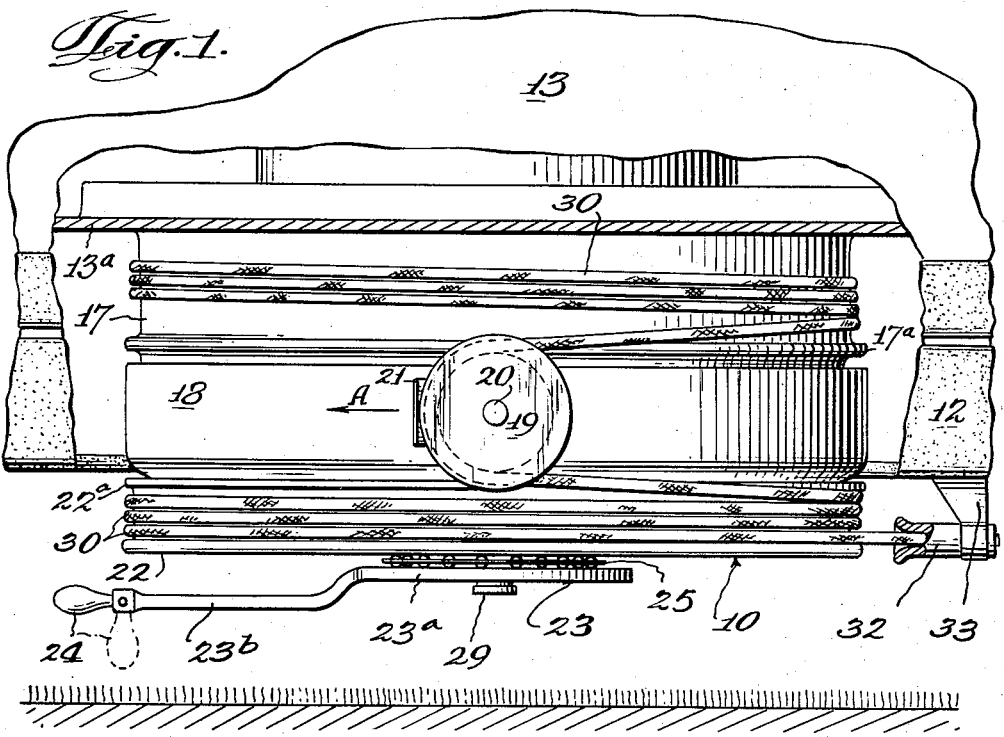
Figure 1 is a fragmentary side elevational view of a vacuum cleaner partially broken away to show an embodiment of the cord reel of this invention substantially fully wound.
Figure 2:
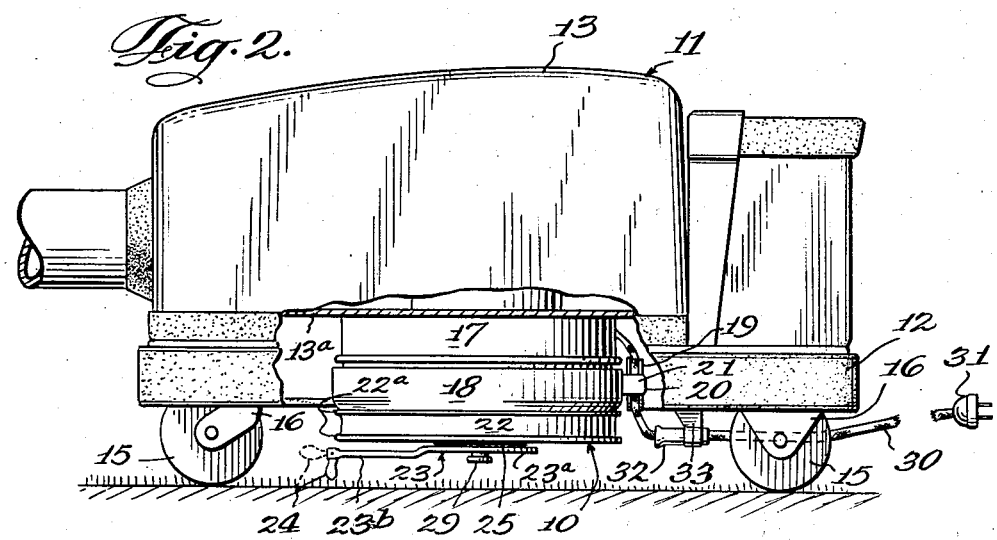
Figure 2 is a reduced fragmentary side elevational view of a vacuum cleaner partially broken away to show the cord reel substantially unwound.

The cord reel 10 as indicated in the embodiment shown in the drawings is attached to a tank type vacuum cleaner 11. The vacuum cleaner generally comprises a base 12 on which is mounted a casing 13. The casing encloses an electric motor 14 of conventional type for operating the usual suction fan. The vacuum cleaner is supported for movement on a plurality of wheels 15 held in brackets 16.

The cord reel 10 is generically cylindrical and includes a stationary member 17 which is attached to the base 13a of the casing. The member 17 is flanged at 17a to aid in retaining the turns of the cord.

The next element of the cord reel is a rotatable winding element 18 carrying a pulley 19 which is mounted for rotation on a radial shaft 20. A guard 21 is attached to the element 18 to help prevent the cord from moving out of engagement with the pulley 19.

The cord reel also includes a freely rotatable portion 22 provided with a pair of spaced marginal lips 22a which tend to maintain the turns of the cord in place.

A crank 23 is substantially rigidly attached to the rotatable element 18 and located in a position beneath the reel 22. The crank 23 has a circular center portion 23a and an extending arm 23b. A ball bearing race 25 is interposed between the circular portion 23a of the crank and the reel portion 22 thus allowing the reel substantially frictionless rotation. A knob 24 which is spring loaded to remain in position aligned with arm 23b is attached to the arm of the crank. However, it may be turned to the position shown in Figure 3 for operation.

The winding element 18, the freely rotatable reel 22 and the crank 23 are carried by a mounting shaft which is attached to the stationary member 17. The top and bottom portions 26a of the mounting shaft are non-circular. These portions 26a are seated in similar shaped openings 18a in the winding element and 23c in the crank. This construction provides a substantially rigid connection between the crank 23 and the rotatable winding element 18 so that winding force may be transmitted from the crank to the winding element.

The center portion 26b of the mounting shaft is cylindrical. A bearing 27 which seats in an opening 22b in the freely rotatable portion 22 is journaled on the cylindrical portion 26b of the mounting shaft. Thus the reel portion 22 freely rotates about the bearing surfaces provided by the bearing 27 and the ball bearing race 25.

A pair of collars 28 attached to the opposite ends of the mounting shaft 26 hold the crank 23, freely rotatable portion 22 and winding element 18 in a single unit. This unit is then substantially rigidly attached to the base 17a of the member 17 by means of a rivet 29 which passes through the hollow center of the mounting shaft 26. As can be seen, the member 17, winding element 18 and reel portion 22 are internested in the manner of internested cups with adjacent bottoms.

A conventional electric cord 30 which has a plug 31 at one end is attached to the electric motor 14 through a connector 31. The cord then passes out through a hole 17b in the stationary member 17. In order to prevent strain on the connector 31 a knot 30a acts as an anchor on the inside of the member 17. The cord then passes in a loop around the pulley 19, under the guard 21 and out through a guide conduit 32 which is carried by a bracket 33 on the casing 13. The guide conduit 32 acts as both a guide and a stop since it prevents continued rotation of the cord reel when the plug 31 abuts its outer surface.

In operating the cord reel of this invention to wind up the cord, the operator rotates the handle 23 in the direction shown by the arrow A in Figure 1. This causes the cord to be drawn in through the guide conduit 32 and to be wound on the freely rotatable reel portion 22 and the stationary member 17. With this arrangement, a substantially equal number of turns of electric cord 30 will be deposited on the stationary member 17 and on the rotatable reel portion 22 in a substantially frictionless manner. When it is desired to unwind the cord, the operator need only pull on the plug 31 to easily unwind the electric cord 30 from the reel.

Having thus described my invention as related to the embodiment shown in the accompanying drawings, it is my intention that the invention be not limited by any of the details of description unless otherwise specified, but rather be construed broadly within its spirit and scope as set out in the accompanying claims.

I claim:

1. A cord winding and storage mechanism for use on an electrical appliance such as a vacuum cleaner, comprising: a substantially stationary member arranged to receive turns of a cord, said cord having a portion anchored adjacent said member; a rotatable reel portion arranged to receive turns of the cord spaced from said member, said reel having a substantially flat centrally located area; a rotatable member interposed between said first member and reel portion and arranged to move relative thereto; a pulley carried by said rotatable member having a section of the cord passing thereover for directing it onto said stationary member and reel portion, the axis of rotation of said pulley being generally radial; a shaft rotatably carried at one end by said stationary member and passing through said reel portion and said rotatable member, said shaft having one portion substantially rigidly connected to said rotatable member and another portion allowing said reel portion to rotate thereabout; rotating means attached to the other end of said shaft outwardly of said reel portion for rotating said rotatable member, said means having a substantially flat supporting portion; and a friction reducing bearing interposed between said flat area on said reel portion and said supporting portion thereby providing a friction reducing support for said reel portion during rotation of said rotatable member.

2. The device of claim 1 wherein said portion of said shaft allowing said reel portion to rotate thereabout is substantially cylindrical in cross section.

3. The device of claim 2 wherein said rotating means is a hand crank and said supporting portion is a circular plate.

References Cited in the file of this patent

UNITED STATES PATENTS

| | | |
|---|---|---|
| 1,322,407 | Chegwidden et al. | Nov. 18, 1919 |
| 1,914,480 | Brosilow | June 20, 1933 |
| 1,946,778 | Cline | Feb. 13, 1934 |
| 2,605,977 | Gleason | Aug. 5, 1952 |